United States Patent [19]

Clark

[11] Patent Number: 5,206,194
[45] Date of Patent: Apr. 27, 1993

[54] PROCESS FOR REACTIVATING A DEACTIVATED CRYSTALLINE MOLECULAR SIEVE GROUP VIII METAL CATALYST

[75] Inventor: Danford E. Clark, Fountain Valley, Calif.

[73] Assignee: Union Oil Company of America, Los Angeles, Calif.

[21] Appl. No.: 717,985

[22] Filed: Jun. 20, 1991

[51] Int. Cl.$^5$ .................. B01J 29/38; B01J 38/66; B01J 38/14; C10G 47/18
[52] U.S. Cl. .................. 502/26; 208/111; 208/140; 502/38; 502/52
[58] Field of Search .................. 502/26, 38, 49, 52

[56] References Cited

U.S. PATENT DOCUMENTS

| | | | |
|---|---|---|---|
| 3,692,692 | 9/1972 | Ward et al. | 208/111 |
| 3,835,028 | 9/1974 | Ward et al. | 208/111 |
| 3,849,293 | 11/1974 | Ward | 208/111 |
| 3,899,441 | 8/1975 | Hansford | 208/120 |
| 3,943,051 | 3/1976 | Ward | 208/111 |
| 4,002,575 | 1/1977 | Ward | 208/111 |
| 4,055,482 | 10/1977 | Robson | 502/26 |
| 4,107,031 | 8/1978 | Ward | 208/111 |
| 4,139,433 | 2/1979 | Ward | 208/111 |
| 4,190,553 | 2/1980 | Ward | 208/111 |
| 4,429,053 | 1/1984 | Ward | 502/65 |
| 4,604,373 | 8/1986 | Clark | 502/65 |
| 4,645,751 | 2/1987 | McCulleh et al. | 502/36 |
| 4,650,780 | 3/1987 | Krishnamurthy et al. | 502/50 |
| 4,657,874 | 4/1987 | Borghard et al. | 502/35 |
| 4,857,169 | 8/1989 | Abdo | 208/59 |
| 4,977,119 | 12/1990 | Koves | 502/48 |
| 5,001,094 | 3/1991 | Chang et al. | 502/26 |

*Primary Examiner*—Paul E. Konopka
*Attorney, Agent, or Firm*—Yale S. Finkle; Gregory F. Wirzbicki

[57] ABSTRACT

A reactivated catalyst having optimum activity for hydrocracking and other acid catalyzed chemical conversion processes is prepared by contacting its deactivated counterpart, which contains a crystalline molecular sieve, a Group VIII noble metal hydrogenation component and carbonaceous deposits, with a gas containing molecular oxygen, preferably air, at a temperature between 950° and 1200° F., preferably between about 1050° and 1150° F., for a time sufficient to remove at least a portion of the carbonaceous deposits. When the reactivated catalyst contains a dealuminated Y zeolite that has been ion-exchanged with both noble metal and rare earth metal cations, its activity for hydrocracking in an ammonia-deficient atmosphere can be further increased by a rejuvenation procedure in which the reactivated catalyst is contacted with an aqueous ammonia solution in which an ammonium salt has been dissolved.

43 Claims, 1 Drawing Sheet

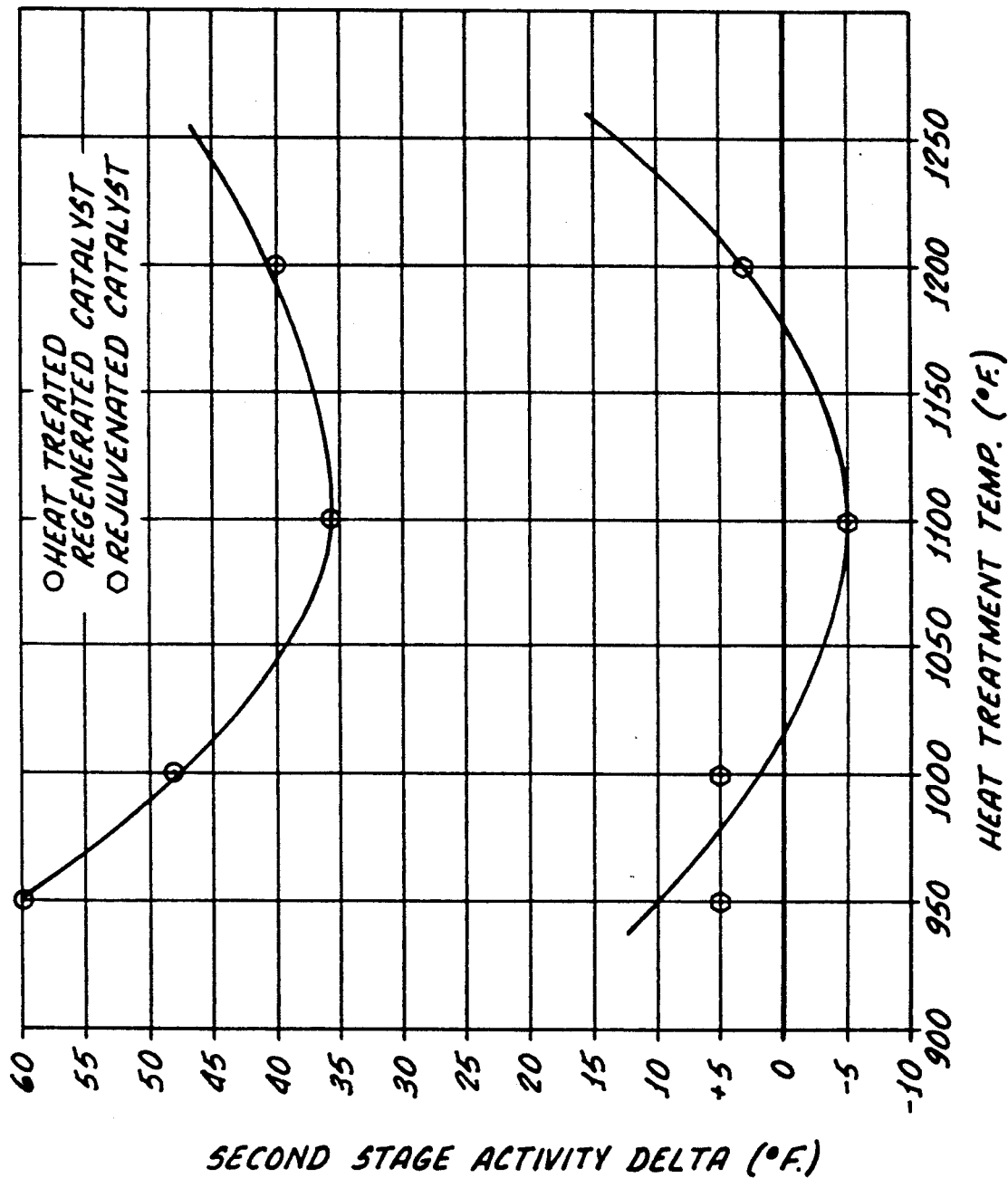

PROCESS FOR REACTIVATING A DEACTIVATED CRYSTALLINE MOLECULAR SIEVE GROUP VIII METAL CATALYST

BACKGROUND OF THE INVENTION

The invention relates to a process for reactivating deactivated catalysts, the reactivated catalysts produced by the process, and the use of the reactivated catalysts in acid catalyzed chemical conversion processes, such as hydrocarbon conversion processes. The invention is particularly concerned with reactivating deactivated hydrocracking catalysts which comprise a crystalline molecular sieve, a Group VIII noble metal hydrogenation component and carbonaceous deposits, and the use of the reactivated catalysts in hydrocracking processes, particularly hydrocracking in the substantial absence of ammonia.

Petroleum refiners often produce desirable products, such as gasoline and turbine fuel, by catalytically hydrocracking high boiling hydrocarbons into product hydrocarbons of lower average molecular weight and boiling point. Hydrocracking is generally accomplished by contacting, in an appropriate reactor vessel, a gas oil or other hydrocarbon feedstock with a suitable hydrocracking catalyst under appropriate conditions, including an elevated temperature and an elevated pressure and the presence of hydrogen, such that a hydrocarbon product is obtained containing a substantial portion of a desired product boiling in a specified range, as for example, a heavy gasoline boiling in the range of 185° to 420° F.

Oftentimes, hydrocracking is performed in conjunction with hydrotreating, usually by a method referred to as "integral operation." In this process, the hydrocarbon feedstock, usually a gas oil containing a substantial proportion of components boiling above a desired end point, as for example, 420° F. in the case of certain gasolines, is introduced into a catalytic hydro-treating zone wherein, in the presence of a suitable catalyst, such as a zeolite- or sieve-free, particulate catalyst comprising a Group VIII metal component and a Group VIB metal component on a porous, inorganic, refractory oxide support most often composed of alumina, and under suitable conditions, including an elevated temperature (e.g., 400° to 1000° F.) and an elevated pressure (e.g., 100 to 5000 p.s.i.g.) and with hydrogen as a reactant, the organonitrogen components and the organosulfur components contained in the feedstock are converted to ammonia and hydrogen sulfide, respectively. Subsequently, the entire effluent removed from the hydro-treating zone is treated in a hydrocracking zone maintained under suitable conditions of elevated temperature, pressure, and hydrogen partial pressure, and containing a suitable hydrocracking catalyst, such that a substantial conversion of high boiling feed components to product components boiling below the desired end point is obtained. Usually, the hydrotreating and hydrocracking zones in integral operation are maintained in separate reactor vessels, but, on occasion, it may be advantageous to employ a single, downflow reactor vessel containing an upper bed of hydrotreating catalyst particles and a lower bed of hydrocracking particles. Examples of integral operation may be found in U.S. Pat. Nos. 3,132,087, 3,159,564, 3,655,551, and 4,040,944, all of which are herein incorporated by reference in their entireties.

In some integral operation refining processes, and especially those designed to produce gasoline from the heavier gas oils, a relatively high proportion of the product hydrocarbons obtained from integral operation will have a boiling point above the desired end point. For example, in the production of a gasoline product boiling in the $C_4$ to 420° F. range from a gas oil boiling entirely above 570° F., it may often be the case that as much as 30 to 60 percent by volume of the products obtained from integral operation boil above 420° F. To convert these high boiling components to hydrocarbon components boiling below 420° F.,+ the petroleum refiner separates the 420° F.+ high boiling components from the other products obtained in integral operation, usually after first removing ammonia by a water washing operation, a hydrogen-containing recycle gas by high pressure separation, and an $H_2S$-containing, $C_1$ to $C_3$ low BTU gas by low pressure separation. This 420° F.+ boiling bottom fraction is then subjected to further hydrocracking, either by recycle to the hydrocracking reactor in single stage operation or by introduction into a second hydrocracking zone wherein yet more conversion to the desired $C_4$ to 420° F. product takes place.

In the foregoing two-stage process, the two hydrocracking reaction zones can contain hydrocracking catalysts of the same or different composition. One catalyst suitable for use in both reaction zones is disclosed as Catalyst A in Example 16 of U.S. Pat. Nos. 3,897,327 and 3,929,672, both of which are herein incorporated by reference in their entireties, which catalyst is comprised of a palladium-exchanged, steam-stabilized Y zeolite hydrocracking component. But although the catalysts used in the two hydrocracking reaction zones may have the same composition and the same catalytic properties, the hydrocracking conditions required in the second hydrocracking reaction zone are less severe than those required in the first. The reason for this is that ammonia is not present in the second hydrocracking reaction zone (due to water washing) whereas a significant amount of ammonia is present in the first hydrocracking zone. To account for the difference in operating conditions, it is believed that ammonia neutralizes or otherwise interferes with the acidity of the zeolite in the catalyst of the first reaction zone, thereby forcing the refiner to employ relatively severe conditions for operation, as for example, increased temperature. On the other hand, in the ammonia-deficient atmosphere of the second hydrocracking reaction zone, high conversions to the desired product are obtainable under relatively moderate conditions, often with an operating temperature about 100. to 210° F. lower than that required in the first hydrocracking reaction zone.

Further description of two-stage hydrocracking operations may be found in U.S. Pat. Nos. 4,429,053 and 4,857,169 herein incorporated by reference in their entireties, which patents provide process flow sheets for typical two-stage hydrocracking processes.

Although hydrocracking catalysts containing noble metal-exchanged zeolites are effective for use in single stage hydrocracking as discussed above or in either the first or second stage of the two-stage process discussed above, the activity of such catalysts is diminished during the course of hydrocracking as coke materials deposit on the catalyst particles and interfere with the activity of the catalyst. It is thus necessary to periodically regenerate the catalyst by combusting these carbonaceous deposits, usually at temperatures between 700° and 925° F. It has been found, however, that, after regeneration at temperatures in this range, the catalyst used in the second hydrocracking reaction zone loses substantial activity for hydrocracking under the relatively moderate conditions employed therein.

Many attempts have been made to overcome the detrimental effects associated with regenerating hydrocracking catalysts for use in the ammonia-deficient environments of the second hydrocracking zone, in particularly with respect to catalysts containing noble metal-exchanged zeolites. These attempts have largely focused on methods for restoring some or all of the catalytic activity lost through regeneration by treating the regenerated catalyst with an ammonium salt, ammonium hydroxide, gaseous ammonia, or mixtures thereof, thereby rejuvenating the catalyst. The general theory behind these methods is that the activity losses of catalysts used in hydrocracking environments are caused by the agglomeration of the otherwise dispersed noble metal hydrogenation component, and the ammoniation treatments redisperse the noble metal component.

Although the above-discussed methods of regeneration and rejuvenation of catalysts containing noble metal-exchanged zeolites have met with some success, the results have not been consistent. For example, in various instances regeneration has resulted in "reactivated" catalysts that range from about 60° to 110° F. less active than the fresh catalyst for hydrocracking under second stage conditions, i.e., hydrocracking in an ammonia-deficient atmosphere. Furthermore, for catalysts which can withstand rejuvenation utilizing ammonia or ammonium ion treatments without collapse of the zeolitic crystal structure, regeneration followed by rejuvenation has resulted in reactivated catalysts that are between 10° F. and 35° F. less active than the fresh catalyst for hydrocracking under second stage conditions.

Accordingly, it should be clear that new methods for reactivating deactivated noble metal-exchanged zeolitic catalysts, particularly hydrocracking catalysts, are needed so that their catalytic activity is substantially restored to the activity of the fresh catalyst prior to deactivation.

SUMMARY OF THE INVENTION

In accordance with the invention, it has now been surprisingly found that the activity of a reactivated catalyst comprising a crystalline molecular sieve and a Group VIII noble metal component is sensitive to the temperature at which its deactivated counterpart is regenerated and that optimum activity of the reactivated catalyst is not obtained unless the regeneration temperature is above about 950° F., usually above about 1000° F. Accordingly, the invention is directed to a process for reactivating a deactivated catalyst, and the reactivated catalyst resulting therefrom, by contacting the deactivated catalyst, which comprises a crystalline molecular sieve, a Group VIII noble metal component and carbonaceous deposits, with a gas containing molecular oxygen in a combustion zone at a temperature between 950° F. and about 1200° F. for a time sufficient to remove at least a portion of the carbonaceous deposits via combustion. It has been unexpectedly found that, to obtain optimum activity upon reactivation, the temperature of the catalyst during the combustion step should usually be in a range around about 1100° F., and therefore it is generally preferred that the deactivated catalyst be contacted with the gas containing molecular oxygen so that the temperature of the catalyst is maintained in a range between about 1025° F. and 1175° F., more preferably between 1050° F. and 1150° F., and most preferably between 1075° F. and 1125° F.

It has been found that the activity of certain types of catalysts that have been reactivated in accordance with the embodiment of the invention described above, when used in particular applications, can be further improved by subjecting the regenerated catalyst to rejuvenation procedures to disperse the noble metal components, usually by treating the regenerated catalyst with an aqueous ammonia solution containing a dissolved ammonium salt. For example, it has been found that the activity of a regenerated catalyst that contains a dealuminated Y zeolite having an overall silica-to-alumina mole ratio above about 6.0, which Y zeolite has been exchanged with both noble metal-containing cations and rare earth-containing cations, can be significantly improved for second stage hydrocracking under ammonia-deficient conditions by treating the regenerated catalyst with an aqueous ammonia solution containing dissolved ammonium bicarbonate. In fact, it has been surprisingly found that, when optimum regeneration temperatures are used to produce a reactivated catalyst from its deactivated counterpart, rejuvenation of the reactivated catalyst results in a second stage activity that is higher than the second stage activity of the fresh catalyst.

The reactivated catalysts of the invention have been found to have catalytic activity with respect to a variety of acid catalyzed chemical conversion reactions and are therefore useful in a variety of hydrocarbon conversion processes including hydrocracking processes, with particular use being found in hydrocracking processes employing an ammonia-deficient environment. For example, a reactivated catalyst of the invention can be employed in the second hydrocracking zone of a petroleum refining process wherein a hydrocarbon feedstock is first treated employing an integral hydrotreating-hydrocracking operation followed by further hydrocracking of unconverted components in a second hydrocracking zone wherein an ammonia-deficient environment exists.

BRIEF DESCRIPTION OF THE DRAWING

The drawing is a plot which shows that the activity for second stag hydrocracking under ammonia-deficient conditions of a catalyst reactivated in accordance with the process of the invention is at an optimum when the regeneration temperature is between about 1050° and 1150° F.

DETAILED DESCRIPTION OF THE INVENTION

The present invention is directed to a process for reactivating a catalyst comprising a molecular sieve and a Group VIII noble metal hydrogenation component, which catalyst has been deactivated by the formation thereon of carbonaceous deposits during use of the catalyst in a catalytic conversion process. The invention is also directed to the reactivated catalyst produced by this process and the use of such a reactivated catalyst in acid catalyzed chemical conversion processes, particularly hydrocracking processes. The present invention is particularly directed to reactivating a noble metal-exchanged, zeolitic hydrocracking catalyst by combusting the carbonaceous deposits contained thereon in the presence of a gas-containing molecular oxygen at a temperature between 950° F. and about 1200° F., and then reusing the regenerated catalyst to hydrocrack hydrocarbon feeds. The invention is also directed to rejuvenating the regenerated catalyst by dispersing the Group VIII noble metal components, and then reusing the rejuvenated catalyst to hydrocrack a hydrocarbon feedstock in the substantial absence of ammonia, i.e., in an atmosphere containing less than about 200 ppmv ammonia, preferably less than about 20 ppmv.

Deactivated catalysts which may be reactivated in accordance with the invention usually comprise at least one Group VIII noble metal component supported on a mixture of a crystalline molecular sieve and a porous, inorganic refractory oxide component. These deactivated catalysts also contain carbonaceous deposits which reduce their effective surface area and pore volume, thereby substantially decreasing their activity compared to that of their fresh counterparts.

The crystalline molecular sieve component of the deactivated and reactivated catalysts may be a nonzeolitic or a zeolitic molecular sieve having cracking activity in its activated form and is present in the deactivated and reacted catalysts in amounts that typically range from 10 to 90 weight percent, based on the weight of their fresh counterparts, frequently between about 70 and 90 weight percent. The term "molecular sieve" as used herein refers to any material capable of separating atoms or molecules based on their respective dimensions. The term "pore size as used herein refers to the diameter of the largest molecule that can be sorbed by the particular molecular sieve in question. The measurement of such diameters and pore sizes is discussed more fully in Chapter 8 of the book entitled "Zeolite Molecular Sieves" written by D. W. Breck and published by John Wiley & Sons in 1974, the disclosure of which book is hereby incorporated by reference in its entirety. The term "nonzeolitic" as used herein refers to molecular sieves whose frameworks are not formed of substantially only silicon and aluminum atoms in tetrahedral coordination with oxygen atoms whereas the term "zeolitic" as used herein refers to molecular sieves whose frameworks are formed of substantially only silicon and aluminum atoms in tetrahedral coordination with oxygen atoms, such as the frameworks present in ZSM-5 zeolites, zeolite beta, zeolite L, zeolite omega, Y zeolites and X zeolites. Preferably, the molecular sieve used in the catalyst support is a large pore sieve having a pore size greater than about 7.0 angstroms. Thus, the sieve will generally have a low constraint index, typically below 1.0, preferably below 0.75 and usually below 0.5.

Examples of nonzeolitic crystalline molecular sieves which may be a component of both the deactivated catalyst and its reactivated counterpart include silicoaluminophosphates, aluminophosphates, ferrosilicates, galliosilicates, borosilicates, chromosilicates, titanium aluminosilicates, titanium silicates, titanium aluminophosphates, gallioaluminosilicates and crystalline silicas. Several of these nonzeolitic molecular sieves are discussed in more detail in U.S. Pat. Nos. 4,867,861 and 4,829,040, the disclosures of which are hereby incorporated by reference in their entireties. It will be understood that, although the reactivated catalysts of the invention may include a nonzeolitic molecular sieve as discussed above, catalysts which are essentially free of such sieves, including galliosilicates and the other specific nonzeolitic molecular sieves mentioned above, are within the scope of the invention.

Examples of zeolitic, crystalline molecular sieves which may be a component of the deactivated catalyst and its reactivated counterpart include Y zeolites, X zeolites, zeolite beta, zeolite L, zeolite omega, mordenite, and modifications of such zeolites. However, the preferred zeolitic molecular sieves are Y zeolites and modified Y zeolites which possess cracking activity. U.S. Pat. No. 3,130,007, the disclosure of which is hereby incorporated by reference in its entirety, describes Y-type zeolites having framework silica-to-alumina mole ratios between 3.0 and 6.0 with a typical Y zeolite having a framework silica-to-alumina mole ratio of about 5.0.

The modified Y zeolites which may be a component of the deactivated catalyst and its reactivated counterpart are generally derived from Y zeolites by treatment which results in a significant modification of the Y zeolite framework structure, usually an increase in the framework silica-to-alumina mole ratio to a value typically above 6.0, and/or a reduction in unit cell size. It will be understood, however, that, in converting a Y zeolite starting material to a modified Y zeolite, the resulting modified Y zeolite may not have exactly the same X-ray powder diffraction pattern for Y zeolites as is disclosed in U.S. Pat. No. 3,130,007. The d-spacings may be shifted somewhat due to a shrinkage in the unit cell size caused by an increase in the framework silica-to-alumina mole ratio. The essential crystal structure of the Y zeolite will, however, be retained so that the essential X-ray powder diffraction pattern of the modified zeolite will be consistent with that of either Y zeolite itself or a Y zeolite of reduced unit cell size. Examples of modified Y zeolites which may be a component of the deactivated catalyst and its reactivated counterpart include steam-stabilized Y zeolites, dealuminated Y zeolites, and ultrahydrophobic Y zeolites.

Ultrahydrophobic zeolites are modified Y zeolites having a unit cell size between about 24.20 and about 24.45 angstroms, preferably between about 24.20 and 24.39 angstroms, most preferably between about 24.20 and 24.35 angstroms, and a sorptive capacity for water vapor less than about 5 weight percent, preferably less than about 4 weight percent, of the zeolite at 25° C. and a p/p. value of 0.10. The zeolites are the same or similar to the UHP-Y zeolites disclosed in U.S. Pat. No. 4,401,556 and U.K. Patent 2,014,970 published on Jun. 29, 1982, the disclosures of which patents are hereby incorporated by reference in their entireties. According to these references, a UHP-Y zeolite is defined as a zeolite having a silica-to-alumina mole ratio of from 4.5 to 35, the essential X-ray powder diffraction pattern of zeolite Y, an ion exchange capacity of not greater than 0.070, a unit cell size from 24.20 to 24.45 angstroms, a surface area of at least 350 square meters per gram (BET), a sorptive capacity for water vapor less than 5 weight percent at 25 C. and a p/p. value of 0.10, and a Residual Butanol Test Value of not more than 0.4 weight percent. The Residual Butanol Test is a measure of the adsorptive selectivity of zeolite adsorbents for relatively nonpolar organic molecules under conditions in which there is active competition between water and less polar molecules for adsorption on the zeolite. The test procedure is described in detail in the above-identified patents. As used herein, "p/p." represent the water vapor partial pressure to which the zeolite is exposed divided by the water vapor partial pressure at 25° C.

Preferably, the ultrahydrophobic zeolite has a silica-to-alumina mole ratio between about 4.5 and 9, the essential X-ray powder diffraction pattern of zeolite Y, an ion exchange capacity of not greater than 0.70, and a Residual Butanol Test Value of not more than 0.4 weight percent. More preferably, the ultrahydrophobic zeolite is LZ-10 zeolite, a modified Y zeolite having a silica-to-alumina mole ratio between about 4.5 and about 6.0, a surface area between about 500 and 700 square meters per gram, a unit cell size between about 24.20 and 24.35 angstroms, and a sorptive capacity for water vapor less than about 5 percent by weight of the zeolite at 25° C. and a p/p. value of 0.10.

Steam-stabilized Y zeolites are Y zeolites which have been hydrothermally treated to increase their framework silica-to-alumina mole ratio but not their overall silica-to-alumina mole ratio. Steam stabilization normally involves calcination of the ammonium or hydrogen form of the Y zeolite starting material at relatively high temperatures, typically above about 900° F., in the presence of steam. This treatment results in the expulsion of tetrahedral aluminum from the framework into non-framework positions, but normally does not remove the aluminum from the zeolite and therefore does not increase the overall silica-to-alumina mole ratio of the starting Y zeolite.

Preferred steam-stabilized Y zeolite which may be a component of the deactivated catalyst and its reactivated counterpart are disclosed in U.S. Pat. No. 3,929,672 herein incorporated by reference in its entirety. These zeolites preferably have a unit cell size above 24.45 angstroms and a water vapor sorptive capacity greater than 15 weight percent at 25° C. and a p/p. value of 0.10, and are, in essence, produced by a three-step procedure in which a sodium Y zeolite usually containing between about 10 and 14 weight percent sodium, calculated as Na$_2$O, and having a unit cell size above about 24.65 angstroms, usually between 24.65 and 24.75 angstroms, is (1) cation exchanged with ammonium ions to decrease its sodium content to between about 0.6 and 5.0 weight percent, calculated as Na2O, (2) calcined at a temperature between about 600° F. and 1,650° F., preferably between about 900° F. and 1300° F., in the presence of steam at a water vapor partial pressure of at least 0.2 psia to reduce the unit cell size of the ammonium-exchanged zeolite to a value in the range between about 24.40 and 24.64 angstroms, preferably between about 24.48 and 24.58 angstroms, and (3) exchanged with ammonium cations to replace at least about 25 weight percent of the residual sodium cations and obtain a zeolite product containing less than about 1.0 weight percent sodium, preferably less than about 0.6 weight percent sodium, calculated as Na$_2$O. The resultant ammonium-exchanged, steam-calcined zeolite may optionally, in a fourth step, be subjected to a further calcination in a dry atmosphere, i.e., in essentially water- and steam-free air, at a temperature usually between about 800° F. and 1000° F.

The steam calcination step described above is usually carried out in the presence of at least about 2.0 psia water vapor, preferably at least 5.0 psia water vapor, and more preferably still between 5 and about 15 psia water vapor, and most preferably of all, in an atmosphere consisting essentially of or consisting of steam.

The preferred steam-stabilized Y zeolites, whether produced by the three- or four-step process described above or steam stabilized via a different route, have (1) a unit cell size or dimension a$_o$ greater than about 24.45 angstroms, preferably between about 24.46 and 24.61 angstroms, and most preferably between about 24.52 and 24.59 angstroms and (2) a sorptive capacity for water vapor greater than about 15 weight percent at 25. C. and a p/p. value of 0.10, preferably greater than 18 weight percent, and usually between about 18 and 25 weight percent. The overall silica-to-alumina mole ratio of these modified Y zeolites generally ranges between 5.1 and 6.0, typically between about 5.4 and 5.9. Examples of preferred steam-stabilized Y zeolites include LZY-82 or Y-82 zeolite and LZY-84 or Y-84 zeolite sold by UOP, CP300-56 zeolite sold by the PQ Corporation and CBV-530, CBV-531, CBV-705, CBV-712 and CBV-720 zeolites sold by Conteka-BV.

Another preferred modified Y zeolite which may be a component of the deactivated catalyst and its reactivated counterpart is a dealuminated Y zeolite prepared by chemically treating Y zeolites with acids, salts or chelating agents to increase their overall silica-to-alumina mole ratio. The preferred dealuminated Y zeolites are a group of zeolites known as LZ-210 zeolites, zeolitic aluminosilicate molecular sieves available from UOP. These zeolites are described in detail in U.S. Pat. Nos. 4,503,023 and 4,711,770, the disclosures of which are hereby incorporated by reference in their entireties. The preferred LZ-210 zeolites have a chemical composition expressed in terms of oxide mole ratios in the anhydrous state of $$(0.85-1.1)M_{2/n}O:Al_2O_3:xSiO_2$$

wherein "M" is a cation having the valence "n" and "x" is a value between 6 and about 20, preferably between 6 and about 15, and more preferably between about 6 and about 10. These LZ-210 zeolites have extraneous silicon atoms in their crystal lattice in the form of SiO$_4$ tetrahedra, preferably in an average amount of at least 1.0 per 10,000 cubic angstroms and typically have an X-ray powder diffraction pattern having at least the d-spacings set forth below in Table I:

TABLE I

| d (Angstroms) | Intensity |
|---|---|
| 14.17–13.97 | very strong |
| 8.68–8.55 | medium |
| 7.40–7.30 | medium |
| 5.63–5.55 | strong |
| 4.72–4.66 | medium |
| 4.34–4.28 | medium |
| 3.74–3.69 | strong |
| 3.28–3.23 | strong |
| 2.83–2.79 | strong |

LZ-210 zeolites are conveniently prepared from a Y zeolite starting material in silica-to-alumina mole ratios between about 6.0 and about 20, although higher ratios are possible. Typically, the unit cell size is at or below 24.63 angstroms and will normally range between about 24.40 and about 24.63 angstroms, preferably between about 24.47 and 24.62 angstroms. LZ-210 zeolites having a silica-to-alumina mole ratio below 20 generally have a sorptive capacity for water vapor at 25° C. and 4.6 mm mercury water vapor partial pressure of at least 20 weight percent based on the anhydrous weight of the zeolite. Normally, the oxygen sorptive capacity at 100 mm mercury and −183° C. will be at least 25 weight percent.

In general, LZ-210 zeolites may be prepared by contacting a conventional Y zeolite having an overall silica-to-alumina mole ratio less than about 6.0 with an aqueous solution of a fluorosilicate salt, preferably a solution of ammonium hexafluorosilicate to extract aluminum from the framework structure while incorporating silicon from the solution therein. The dealumination and silicon incorporation is accomplished by placing an ammonium-exchanged Y zeolite into an aqueous reaction medium such as an aqueous solution of ammonium acetate, and slowly adding an aqueous solution of ammonium hexafluorosilicate. After allowing the reaction to proceed, a zeolite having an increased silica-to-alumina mole ratio is produced. The magnitude of the increase is dependent at least in part on the amount of fluorosilicate solution contacted with the zeolite and on the reaction time allowed. Normally, a reaction time of between about 10 and about 24 hours is sufficient for equilibrium to be achieved. The resulting solid product, which may be separated from the aqueous reaction medium by conventional filtration techniques, is a form of LZ-210 zeolite. In order to provide greater activity and crystalline stability, this product may be subjected to a steam calcination by contacting the product with water vapor at a partial pressure of at least 0.2 p.s.i.a. for a period of between about ¼ to about 3 hours at a temperature between about 900° F. and about 1500° F.

Catalysts to be reactivated in accordance with the invention and their reactivated counterparts contain, in addition to the above-discussed crystalline molecular sieves, a Group VIII noble metal hydrogenation component, which is usually ion exchanged into the zeolite before it is composited with the inorganic refractory oxide component of the catalyst. The Group VIII noble metals which can be used in the hydrogenation component include platinum, palladium, rhodium, iridium, ruthenium and osmium. The preferred noble metal component comprises platinum or palladium with palladium being most preferred. Typically, the deactivated catalyst and its reactivated counterpart contain at least 0.1, preferably between about 0.2 and about 8.0, and more preferably between about 0.4 and 2.0, weight percent of the noble metal component, calculated as the metal, and based on the weight of their fresh counterparts.

Examples of the inorganic refractory oxide component of the deactivated catalyst and its reactivated counterpart include alumina, silica-alumina, silica-magnesia, clay such as kaolin, as well as combinations of these and other materials. Such a component is usually present in the deactivated and reactivated catalysts in an amount between about 10 and 90 weight percent, frequently between about 10 and 40 weight percent, based on the weight of their fresh counterparts. The crystalline molecular sieve and the porous, inorganic refractory oxide component are physically integrated into particles which may have various cross sectional sizes and shapes, e.g., a circle, trilobal clover-leaf, quadrolobal clover-leaf, etc., and are usually between about 1/16 and ⅜ of an inch in length. Preferably, the catalyst particles are in the shape of cylinders but, as mentioned above, other cross sectional shapes are possible as is shown, for example, in FIGS. 8 and 10, respectively, in U.S. Pat. No. 4,028,227 herein incorporated by reference in its entirety. Although the catalyst particles are normally in the form of extrudates, they may also be in the shape of tablets, granules, spheres and pellets. It will be understood, of course, in the foregoing description that the porous, inorganic refractory oxide is used a binder material for the crystalline molecular sieve, and accordingly, if desired, other materials may be present in the catalyst including, for example, inorganic refractory oxide diluents which may or may not possess some type of catalytic activity. Examples of such diluents include clays, alumina, silica-alumina, and a heterogeneous dispersion of finely divided silica-alumina in an alumina matrix, which dispersion is described in detail in U.S. Pat. Nos. 4,097,365 and 4,419,271, the disclosures of which are herein incorporated by reference in their entireties.

In some instances, the deactivated catalyst and its reactivated counterpart may contain rare earth metal cations in addition to the noble metal hydrogenation component. These rare earth metal cations are normally ion exchanged into the molecular sieve from rare earth metal solutions derived from ores such as bastnaesite and monazite. Such rare earth solutions typically contain a mixture of rare earth cations including lanthanum, cerium, praseodymium, neodymium, samarium, europium, gadolinium, terbium, dysprosium, holmium, erbium, thulium, ytterbium and lutetium. In general, if the deactivated and reactivated catalysts do contain rare earth metals, they are present in amounts between about 2 and 10 weight percent, calculated as $RE_2O_3$ and based on the weight of their fresh counterparts. Catalysts comprising a dealuminated Y zeolite which has been ion exchanged with both noble metal and rare earth-containing cations, and methods of making such catalysts, are described in detail in U.S. Pat. Nos. 4,429,053; 4,604,373 and 4,857,169, the disclosures of which are herein incorporated by reference in their entireties.

During the course of processing a hydrocarbon-containing oil, fresh catalysts comprising a crystalline molecular sieve and a Group VIII noble metal component become deactivated as carbonaceous deposits or coke accumulate thereon, thereby reducing their total available surface area and plugging their pores. The resultant deactivated or spent catalysts normally contain more than about 0.5 weight percent carbonaceous deposits, calculated as carbon, typically between about 2.0 and 20 weight percent, and frequently between 5 and 15 weight percent. These catalysts also may contain small amounts, i.e., less than about 1.0 weight percent calculated as the element, of sulfur and nitrogen components. Typically, these deactivated catalysts lose, compared to their fresh counterparts, at least about 50 percent, normally at least about 80 percent, and frequently over 100 percent, of their catalytic activity at the end of the processing cycle.

It has been surprisingly found that, when such deactivated catalysts are reactivated via regeneration, i.e., by removing the coke by oxidation to carbon monoxide, carbon dioxide and water, the activity of the regenerated catalyst is sensitive to the regeneration temperature. If the deactivated catalyst is subjected to a temperature which is too low or too high during regeneration, the activity of the regenerated catalyst will not be at an optimum. It has been found that for the regenerated catalyst to have an optimum activity, the catalyst must reach a temperature between 950° F. and 1200° F. during regeneration. Thus, the deactivated catalyst is typically regenerated or reactivated by contacting it with a gas containing molecular oxygen under conditions such that the catalyst is subjected to a temperature in this range while at least a portion of the carbonaceous deposits are burned off.

Prior to subjecting the deactivated catalyst to regeneration, it is contacted with a flowing gas such as air, nitrogen or the like at temperatures below that at which combustion of the carbonaceous deposits occurs, typically at temperatures between about 350° and 450° F., to remove volatile components such as free water and light hydrocarbons. After this low temperature treatment, the deactivated catalyst is then contacted with a flowing gas containing molecular oxygen under conditions such that the temperature of the deactivated catalyst is raised to between 950° and 1200° F. as at least a portion of the carbonaceous deposits are combusted. Also, small amounts of other materials subject to oxidation, such as nitrogen and sulfur components, will be removed. It has been found that the activity of the resulting regenerated catalyst reaches an optimum when the combustion temperature is near about 1100 F. Thus, it is normally preferred that the catalyst reach a temperature in the combustion zone between about 1025° F. and 1175° F., more preferably between about 1050° F. and 1150° F., and most preferably between about 1075° F. and 1125° F. Typically, the combustion of the carbonaceous material is continued until less than about 1.0 weight percent carbonaceous material, calculated as carbon, remains on the catalyst, frequently less than about 0.5 weight percent.

The oxygen-containing gas used to combust the carbonaceous deposits may be any inert gas which contains oxygen and is free of other reactive compounds such as water and chlorine. It is important that the gas be substantially free of water and steam since these substances will cause the noble metal components to agglomerate at high temperatures and thereby reduce the activity of the regenerated catalyst. Normally, the oxygen content of the gas will range between about 0.5 and 50 volume percent, typically between 5 and 25 volume percent. Generally, air, which contains about 20 volume percent oxygen, is the preferred gas. The deactivated catalyst is normally contacted with air or other gas containing molecular oxygen for a time sufficient to remove the desired amount of carbonaceous material. The contacting time will normally range between 5 minutes and 10 hours, usually between 2 and 6 hours and frequently between 3 and 5 hours.

The deactivated catalyst can be regenerated or reactivated in the reactor in which it became deactivated or it can be removed from the reactor and then regenerated. If the regeneration is carried out in the reactor, i.e., in-situ, the catalyst is first stripped with nitrogen or other inert gas to remove light hydrocarbons, free water and other volatiles and then contacted in a fixed bed with a gas containing molecular oxygen, which gas is passed downwardly through the fixed bed at pressures sufficient to force the gas uniformly through the deactivated catalyst, usually pressures between about 50 and 200 psia. The oxygen content of the downflowing gas is typically controlled so that the peak combustion temperature is kept below the temperature at which the noble metal-components agglomerate If, on the other hand, the deactivated catalyst is first removed from the reactor and then regenerated, i.e. ex-situ, the carbonaceous deposits are normally removed, after volatiles have been driven off, by combustion at atmospheric pressure in a belt-type regenerator, a direct or indirect fired, rotary-type dryer/calciner, such as a Roto-Louvre dryer, or in similar equipment. Such equipment will be familiar to those skilled in the art. In these types of commercial dryers/calciners, the catalyst bed does not move vertically, but instead is passed in nonuniform thickness either horizontally, such as in belt-type regenerators, or at an incline either up or down from the horizontal in rotary type dryers/calciners. Regardless of whether the catalyst is regenerated in-situ in a fixed bed or ex-situ in a moving, non-vertical bed, the catalyst bed is not normally confined by gas permeable sidewalls such as retention screens.

It should be emphasized that the regeneration temperatures referred to above are the temperatures on the surface of the deactivated catalyst even though the surrounding temperature of the oxygen-containing gas atmosphere may be somewhat different. Typically, the temperature on the surface of the catalyst is determined by catalyst bed temperature sensing devices, such as in-bed thermocouples or infrared pyrometers. During regeneration, the surface temperature of the deactivated catalyst must be controlled to prevent excessive agglomeration of the catalytically active noble metal components which, in turn, causes diminished restoration of catalytic activity.

The reactivated catalysts produced by regeneration in accordance with the process of the invention normally contain less than about 1.0, preferably between about 0.1 and 0.5, weight percent carbonaceous deposits, calculated as carbon. The high temperature regeneration or combustion step also removes hydrogen, sulfur and nitrogen components associated with the deactivated catalysts so that the regenerated catalysts contain less than about 0.2 weight percent of these components, calculated as hydrogen, sulfur, and nitrogen, respectively. The reactivated catalysts typically have a surface area ranging between about 400 and 750, frequently between 500 and 700, square meters per gram. In general, the surface area of the reactivated catalysts is between 20 and 150, frequently between 60 and 125, square meters per gram less than their fresh counterparts.

Catalysts regenerated in accordance with the process of the invention typically have an activity that is at least 50 percent that of the original activity of the fresh catalyst, preferably at least 75 percent, and more preferably at least about 90 percent. The actual percentage of activity restoration will depend primarily on the particular use intended for the regenerated catalyst when it is returned to service. For example, when the regenerated catalyst is a hydrocracking catalyst and is returned to service in ammonia-rich first stage hydrocracking, i.e. hydrocracking in the presence of greater than 2,000 ppmv ammonia, the activity of the catalyst is normally restored to about 99 percent of its fresh activity. In general, catalysts regenerated in accordance with the invention are at least 25° F. more active than the deactivated catalyst, frequently at least 50° F. more active, and quite frequently at least 70° F. more active.

With respect to certain uses, the regenerated catalyst of the invention may not exhibit the desired activity in relation to the fresh catalyst. For example, regenerated catalysts containing dealuminated Y zeolites that have been exchanged with rare earth and noble metal-containing cations may have less than 50 percent the activity of their fresh counterparts when used in ammonia-deficient second stage hydrocracking. It is believed that this failure to reclaim substantially all of the activity of the fresh catalyst upon regeneration is due to the agglomeration of the Group VIII noble metal constituents and the failure of the regeneration procedure to adequately redistribute or redisperse the agglomerated constituents.

It has now been surprisingly found that the activity of such catalysts regenerated in accordance with the process of the invention can be further increased to a level above that of their fresh counterparts by treating the regenerated catalysts with gaseous ammonia or an ammonium-ion containing solution such as an aqueous ammonia solution containing a dissolved ammonia salt.

It is believed that this further treatment, which is referred to as rejuvenation, restores the activity of the catalysts to a level near or above that of their fresh counterparts by dispersing the agglomerated noble metal-containing cations.

One method of carrying out the rejuvenation is described in U.S. Pat. No. 3,899,441, the disclosure of which is hereby incorporated by reference in its entirety, and involves first steam treating the regenerated catalyst to fill its pores with water, treating the water saturated catalyst with ammonia vapor, stripping the catalyst with an inert gas such as nitrogen and then drying and calcining the catalyst. Another rejuvenation technique involves steam-treating the regenerated catalyst followed by a gaseous ammonia treatment, a contacting with an aqueous solution of an ammonium salt such as ammonium nitrate, drying and calcining. This procedure is described in more detail in U S. Pat. Nos. 3,692,692 and 3,835,028, the disclosures of which are hereby incorporated by reference in their entireties.

A preferred method for carrying out the rejuvenation is described in U.S. Pat. No. 3,849,293, the disclosure of which is hereby incorporated by reference in its entirety. This procedure involves treating the regenerated catalyst with an aqueous ammonia solution in which an ammonium salt, such as ammonium nitrate, ammonium carbonate, or ammonium bicarbonate, is dissolved. This technique is typically carried out by placing the regenerated catalyst in a closeable vessel, adding water to the vessel to a level just above that of the catalyst, and then adding an aqueous ammonia solution containing an ammonium salt. The contents of the vessel are then heated to a temperature below the boiling point of water, usually between about 50° and 80° C., as the aqueous ammonia solution containing the ammonium salt is circulated through the catalyst bed. The catalyst is then separated from the solution, washed with deionized water, dried at a temperature between about 90° and 120° C. and then calcined between about 400° and 600° C. The resultant rejuvenated catalyst, especially one containing a dealuminated Y zeolite having an overall silica-to-alumina mole ratio greater than 6.0 that has been ion exchanged with noble metal and rare earth-containing cations, has been found to have an activity for second stage hydrocracking that is equal to or better than that of its fresh counterpart. It is believed that this complete restoration of activity is due to the deactivated catalyst being regenerated in the critical temperature range between 950° and 1200° F.

Other methods for carrying out the rejuvenation are described in U.S. Pat. Nos. 3,943,051; 4,190,553; 4,002,575; 4,107,031 and 4,139,433. The disclosures of these five patents are hereby incorporated by reference in their entireties.

Catalysts of the invention, which have been reactivated either by the regeneration process of the invention or regeneration followed by rejuvenation, can be used for converting hydrocarbons and other organic compounds into more valuable reaction products by acid catalyzed reactions such as isomerization, reforming, hydrogenation, hydrocracking and the like. Normally, however, the reactivated catalysts of the invention are used as hydrocracking catalysts in the conversion of a wide variety of hydrocarbon feedstocks to a hydrocarbon product of lower average boiling point and/or molecular weight. Before such use, however, the noble metal components of the reactivated catalysts are typically reduced to their active form by contacting the catalyst at an elevated temperature, e.g., 300° to 700° F., with hydrogen gas.

The feedstocks that may be subjected to hydrocracking using the reactivated catalysts of the invention include all mineral oils and synthetic oils (e.g., shale oil, tar sand products, etc.) and fractions thereof. Illustrative feedstocks include straight run gas oils, vacuum gas oils, coker gas oils, and catcracker distillates. The typical hydrocracking feedstock, however, contains a substantial proportion of components, usually at least 50 percent by volume, often at least 75 percent by volume, boiling above the desired end point of the product, which end point, in the case of gasoline, will generally be in the range of about 380° to 420° F., and in the case of middle distillates, will typically be in the range of 650° to 700° F. Usually, the feedstock will also contain gas oil components boiling above 550° F., with highly useful results being achievable with feeds containing at least 30 percent by volume of components boiling between 600. and 1100 F.

For best results in hydrocracking, the reactivated catalysts of the invention are employed as a fixed bed of catalytic particulates in a hydrocracking reactor vessel into which hydrogen and the feedstock are introduced and passed in a downwardly direction. Operating conditions in the reactor vessel are chosen so as to convert the feedstock into the desired product, which, in one preferred embodiment, is a hydrocarbon product containing a substantial proportion of gasoline components boiling, for example, in the 50° to 420° F. range. However, other products, such as middle distillates boiling in the 300° to 700° F. range, may also be desired on occasion, and conditions must be adjusted according to the product (or distribution of products) desired. The exact conditions required in a given situation will depend upon the nature of the feedstock, the particular catalyst composition utilized, and the desired product(s). In general, the conditions of operation for hydrocracking will fall into the following usual and preferred ranges:

TABLE II

| Conditions | Usual | Preferred |
|---|---|---|
| Temperature, | | |
| °F. | 450–850 | 500–800 |
| °C. | 232–454 | 260–427 |
| Pressure, | | |
| psig | 750–3500 | 1000–3000 |
| atm | 51–238 | 68–204 |
| LHSV, reciprocal hours | 0.3–5.0 | 0.5–3.0 |
| H$_2$/Feedstock, MSCF/bbl as measured at 60° F. (15.6° C.) and 1 atmosphere | 1–10 | 2–8 |

The foregoing Table II shows the suitable and preferred hydrocracking conditions for single stage or for each stage of a two stage operation. It will be understood, however, that the operating conditions in the two stages of the two stage process are not necessarily identical. In fact, as mentioned hereinbefore, the primary difference in conditions in the two hydrocracking reactor vessels of two stage operation is the presence of substantial ammonia, usually greater than about 2000 ppmv or higher in the first stage, and its essential absence, i.e. less than 200 ppmv and preferably less than about 20 ppmv, in the second, allowing for less severe conditions in the second stage. There may, however, be yet other differences in conditions in any particular situation.

The nature and objects of the invention are further illustrated by the following examples, which are provided for illustrative purposes only and not to limit the invention as defined by the claims. Example 1 demonstrates that the hydrocracking activity in an ammonia-deficient atmosphere of a reactivated catalyst produced by contacting a deactivated catalyst containing a rare earth-exchanged and noble metal-exchanged dealuminated Y zeolite with a gas containing molecular oxygen varies with the temperature of the catalyst during the contacting step and optimum activity occurs when the contacting temperature is between 1000° F. and 1200° F. Example 2 illustrates that the activity of the reactivated catalyst for hydrocracking in an ammonia-deficient atmosphere can be further increased by treating the reactivated catalyst with an ammonium-ion containing solution.

EXAMPLE 1

A commercial gasoline hydrocracking catalyst containing (1) about 80 weight percent of a rare earth exchanged and palladium-exchanged LZ-210 zeolite (a dealuminated Y zeolite) having a silica-to-alumina mole ratio of 6.5, and (2) about 20 weight percent alumina was deactivated by use in a commercial hydrocracking process. The fresh catalyst was in the form of ⅛ inch extrudates, had a surface area of 660 square meters per gram, a rare earth metal content of 6.0 weight percent (calculated as RE ), and a palladium content of 0.8 weight percent calculated as the metal. The zeolite portion of the catalyst had a unit cell size of 24.56 angstroms. After deactivation, the catalyst contained about 7.5 weight percent coke, calculated as carbon, and had a surface area of about 439 square meters per gram.

The deactivated catalyst was regenerated by contact with air in a commercial size Roto-Louvre dryer at a temperature below 950° F., most likely a temperature between about 850° and 925° F. The regenerated catalyst, which contained about 0.80 weight percent carbonaceous deposits, calculated as carbon, was then tested along with the fresh catalyst for hydrocracking activity in both simulated first and second stage hydrocracking of a hydrotreated, partially hydrocracked vacuum gas oil feed having an API gravity of 38.7, an initial boiling point of 320° F., a final boiling point of 850° F. and a 50 percent boiling point of 545° F., with about 20 volume percent boiling below 400° F., as determined by a modified ASTM D1160 distillation.

The fresh and regenerated catalysts were first tested for activity in simulated second stage operation in the absence of ammonia by passing the feedstock through a laboratory size reactor vessel containing about 150 milliliters of the catalyst, which had been pretreated with hydrogen at about 700° F., at a total pressure of 1450 psig, a liquid hourly space velocity (LHSV) of 1.7 reciprocal hours, and a hydrogen feed rate of 8000 scf/bbl as measured at 60° F. In addition, sufficient thiophene was added to the feed to provide a hydrogen sulfide concentration equivalent to 0.5 weight percent sulfur and thereby simulate a hydrogen sulfide-containing atmosphere as it exists in commercial second stage hydrocracking reactors. The temperature conditions were adjusted as necessary to maintain a product of 49.5° API gravity, which, by previously established correlations, corresponds to about a 60 volume percent yield of gasoline-type materials boiling below 420° F., over the course of 100 hours. At the end of the 100 hours, the temperature required to maintain the product was recorded, and using the fresh catalyst as a reference, the activity of the regenerated catalyst relative to the fresh catalyst was calculated.

After the second stage simulation, the conditions in the reactor vessel were altered for first stage simulation under ammonia-rich conditions, in particular, by adding, along with the thiophene, sufficient tert-butyl amine to the feed to provide an ammonia concentration equivalent to 0.2 weight percent nitrogen and adjusting the temperature to maintain production of a liquid product of 47.0. API gravity, which, by previously established correlations, corresponds to about a 40 percent yield of gasoline-type products boiling below 420° F. Again, after a further 100 hours operation, the activity of the regenerated catalyst relative to the fresh catalyst was calculated.

The results of these activity tests are set forth below in the first data line of Table III and indicate that the first stage activity of the regenerated catalyst was 22° F. less than the fresh catalyst while the second stage activity was 107° F. less. Since the activity delta (differential in activity) in the first stage represents about a 75 percent decrease in activity as compared to the fresh catalyst and the activity delta in the second stage represents about a 350 percent decrease in activity with respect to the fresh catalyst, it can be seen that the commercial regeneration of the deactivated catalyst at a temperature below 950° F. was partial at best.

TABLE III

Activity of Regenerated Catalyst After Heat Treatment With Air

| Heat Treatment Temp. (°F.) | Activity Deltas* (°F.) | |
| --- | --- | --- |
| | First Stage | Second Stage |
| <950** | +22 | +107 |
| 950 | +7 | +60 |
| 1000 | +2 | +48 |
| 1100 | +7 | +36 |
| 1200 | +12 | +40 |

*Activity of the heat-treated catalyst minus the activity of the fresh catalyst. The lower the value of the activity delta, the more active is the catalyst.
**The actual temperature at which the deactivated catalyst was regenerated is not specifically known. The regeneration temperature was below 950° F. and is believed to have been in the range of 850° F. to 925° F.

In order to improve the activity of the commercially regenerated catalyst, four 400 milliliters samples of the catalyst were contacted with air each at a different temperature ranging from 950° F. to 1200° F. Each run was conducted by placing the 400 milliliter sample into a 1-½ inch diameter laboratory bench-scale reactor which was immersed in a fluidized sand bath controlled by a Barber Coleman 570 Program Temperature Controller. Dry air was passed through the catalyst bed at atmospheric pressure and at a gas hourly space velocity (GHSV) of 140 reciprocal hours. Since there was only about 0.8 weight percent carbonaceous material, calculated as carbon, remaining on the catalyst, the heat required to reach the desired temperature was supplied by the fluidized sand bath. The temperature of the catalyst bed was raised at a rate of 100° F. per hour until the desired temperature was reached and then held for two hours. After the four samples were individually heat treated in this manner, they were removed from the reactor and tested for first and second stage activity in the same manner as described above with respect to the fresh and commercially regenerated catalysts. The results of the activity testing for the four samples treated at varying temperatures are shown in Table III and in the drawing as a plot of treatment temperature versus second stage activity delta in degrees Fahrenheit.

As can be seen from the data in Table III and in the drawing, the activity of the heat-treated regenerated catalyst in second stage hydrocracking, i.e. in the absence of ammonia, is sensitive to the temperature of the heat treatment. At a treatment temperature of 950° F., the activity temperature of the catalyst is 60° F. greater than that of the fresh catalyst. Since each 30° F. increase or decrease in activity temperature represents approximately a 100 percent decrease or increase, respectively, in catalyst activity, this 60° F. increase in activity temperature represents about a 200 percent decrease in activity of the heat-treated regenerated catalyst as compared to the fresh catalyst. However, the data in the table and drawing indicate that, as the treatment temperature of the catalyst rises, the second stage activity delta decreases to a minimum of +36° F. at 1100° F. and then rises to +40° F. at a treatment temperature of 1200° F., thereby indicating an increase in activity followed by a gradual decrease. Thus, the data in Table III and in the drawing clearly show that there is a critical temperature range in which deactivated catalysts can be regenerated in order to obtain optimum activity of the reactivated catalyst in an ammonia-deficient hydrocracking environment. This critical range appears to be between 950° F. and 1200° F.

It should be noted that, since the deactivated catalyst was commercially regenerated at a temperature below 950° F., the regenerated catalyst contained low amounts of carbonaceous material; the majority of the carbonaceous deposits being removed during the commercial regeneration in air. Thus, although a portion of the residual carbonaceous material was removed by combustion during the subsequent heat treatments in air at 950° F., 1000° F., 1100° F. and 1200° F., the heat thereby generated was very small, and it was necessary to supply nearly all of the heat required in the subsequent heat treatment by a sand bath external to the bench-scale reactor. Commercial applications of the process of the invention, however, will normally involve only one temperature treatment in the optimum range shown by the data in the table and drawing. Thus, in commercial practice a much larger amount of carbon will be removed by oxidative combustion, thereby supplying a portion of the heat required to maintain the catalyst bed at the optimum reactivation temperature. It is believed that the results shown by the data in Table III and in the drawing will not vary greatly in commercial operations wherein a one-step heat treatment or regeneration of the deactivated catalyst in the critical temperature range is carried out.

The first stage activity deltas shown in Table III indicate that treatment of the commercially regenerated catalyst at temperatures of 950° F. and above decrease the activity delta of the regenerated catalyst between about 10° F. [+22-(+12)] and 20° F. This decrease in activity delta represents between a about 33 and 67 percent increase in activity as compared to the commercially regenerated catalyst. The data also tend to indicate that optimum first stage activity is obtained when the temperature of the heat treatment is between about 950° F. and 1100° F. The first stage activity for a catalyst treated at 1000° F. is almost completely restored to the activity of the fresh catalyst.

Although the activity data for second stage hydrocracking obtained in Example 1 shows that there is a critical temperature range in which a deactivated catalyst should be treated so that the reactivated catalyst has optimum activity, the data also indicate that the second stage activity at the optimum treatment temperature, i.e. about 1100° F., results in a second stage activity that is about 36° F. greater than that of the fresh catalyst. This activity delta represents an activity which is less than about half that of the fresh catalyst. In order to determine whether the second stage activity could be improved, the heat treated samples from Example 1 were subjected to a rejuvenation procedure. Between 200 and 400 milliliters of each of the four heat treated catalysts from Example 1 were individually placed into a three neck, round bottom flask fitted at the top with a cold water condenser and a stirrer extending downward into the flask. Water was added to the flask to cover the catalyst, and then a solution of ammonia and ammonium bicarbonate dissolved in water was added. The solution was agitated using the stirrer while the flask was heated to 68 C. by means of a heating mantel wrapped around its outside circumference. Aqueous ammonia was added four times over a five hour period to replenish ammonia lost by evaporation. After five hours, the catalyst was removed from the flask and thoroughly washed with distilled water to remove all ammonia and ammonium bicarbonate residues. The catalyst was then air dried overnight and placed in an oven for eight hours at 110° C. After oven drying, the catalyst was calcined in a furnace at 482° C. Each sample of the calcined catalyst was then tested for first and second stage hydrocracking activity as described in Example 1. The results of these activity tests ar set forth in Table IV below and in the drawing.

TABLE IV

| Activity of Rejuvenated Catalyst | | |
|---|---|---|
| Heat Treatment Temp. (°F.) | Activity Deltas* (°F.) | |
| | First Stage | Second Stage |
| 950 | +5 | +5 |
| 1000 | +7 | +5 |
| 1100 | +3 | −5 |
| 1200 | +9 | +3 |

*Activity of the rejuvenated catalyst minus the activity of the fresh catalyst. The lower the value for the activity delta, the more active is the catalyst.

A comparison of the second stage activity deltas for the rejuvenated catalyst in Table IV with those for the heat treated regenerated catalyst in Table II clearly show that the rejuvenation procedure was quite successful in increasing the activity of the heat treated catalyst to near fresh activity. The second stage activity deltas of the rejuvenated catalyst range from +5° to −5° F. as compared to the second stage activity deltas of the heat treated regenerated catalysts which range from +60° to +36° F. Thus, the rejuvenation procedure was effective in increasing the activity of the heat treated catalyst in a range from about 100 to 200 percent. The second stage activity deltas for the rejuvenated catalyst also indicate a clearly unexpected result in that the activity delta of the regenerated catalyst sample that had been heat treated at 1100° F. was decreased from +36° F. to −5° F., which indicates an activity greater than that of the fresh catalyst. Thus, it appears that the same critical temperature range for the heat treatment which gave optimum second stage activities for the heat treated regenerated catalyst also gives optimum activities for the rejuvenated catalyst.

A comparison of the first stage activity deltas in Table IV with those in Table III indicate that the rejuvenation procedure had little if any effect on increasing the activity of the heat treated regenerated catalysts under ammonia-rich hydrocracking conditions. As indicated in Table III, the heat treated catalyst had first stage activity deltas ranging between +2° F. and +12° F. whereas the rejuvenated catalyst exhibited activity deltas under first stage conditions ranging between +3° F. and +9° F.

Although this invention has been primarily described in conjunction with examples and by reference to several embodiments of the invention, it is evident that many alternatives, modifications and variations will be apparent to those skilled in the art in light of the foregoing description. Accordingly, it is intended in the invention to embrace these and all such alternatives, variations and modifications as may fall within the spirit and scope of the appended claims.

I claim:

1. A process for reactivating a deactivated hydrocracking catalyst produced by subjecting a fresh catalyst to hydrocracking conditions in the presence of a hydrocarbon feedstock wherein said deactivated catalyst comprises (1) a crystalline, dealuminated Y zeolite having an overall silica-to-alumina mole ratio above about 6.0, said zeolite having been ion-exchanged with rare earth-containing cations and Group VIII noble metal-containing cations, (2) a porous, inorganic refractory oxide and (3) carbonaceous deposits, which process comprises:
   (a) contacting said deactivated catalyst with a flowing gas containing between about 20 and about 25 volume percent molecular oxygen in a combustion zone at a temperature between about 1025° F. and 1175° F. for a time sufficient to remove at least a portion of said carbonaceous deposits via combustion; and
   (b) recovering a reactivated catalyst from said combustion zone, said reactivated catalyst having an activity temperature for hydrocracking less than about 48° F. above the activity temperature of said fresh catalyst.

2. A process as defined by claim 1 wherein said deactivated catalyst contains between about 2.0 and 20 weight percent carbonaceous deposits, calculated as carbon.

3. A process as defined by claim 1 wherein said crystalline molecular sieve has a constraint index less than about 1.0.

4. A process as defined by claim 1 wherein said deactivated catalyst is contacted with said flowing gas at a temperature between about 1050° F. and about 1150° F.

5. A process as defined by claim 1 wherein said deactivated catalyst is contacted with said flowing gas at a temperature between about 1075° F. and about 1125° F.

6. A process as defined by claim 1 wherein said contacting is carried out for a period of time between about 2.0 and about 6.0 hours.

7. A process as defined by claim 1 wherein a reactivated catalyst is recovered from said combustion zone and has an activity temperature at least 50° F. greater than the activity temperature of said deactivated catalyst.

8. A process as defined by claim 1 wherein said crystalline dealuminated Y zeolite is prepared by contacting a zeolite of the Y crystal structure and an overall silica-to-alumina mole ratio below 6.0 with an aqueous solution of fluorosilicate salt.

9. A process as defined by claim 8 wherein said fluorosilicate salt is ammonium hexafluorosilicate.

10. A process as defined by claim 9 wherein said crystalline dealuminated Y zeolite is LZ-210 zeolite.

11. A process as defined by claim 1 wherein said crystalline dealuminated Y zeolite has a composition expressed in terms of oxide mole ratios in the anhydrous state of $$(0.85-1.1)M_{2/n}O:Al_2O_3:xSiO_2$$

wherein "M" is a cation having a valence of "n" and "x" has a value between 6 and about 20, said Y zeolite having an X-ray powder diffraction pattern comprising at least the d-spacings set forth in Table I.

12. A process as defined by claim 11 wherein "x" has a value between about 6 and 10.

13. A process as defined by claim 1 wherein said Group VIII noble metal-containing cations comprise palladium or platinum.

14. A process as defined by claim 1 further comprising the step of increasing the activity of said reactivated catalyst recovered from said combustion zone by treating said recovered catalyst to disperse said noble metal-containing cations.

15. A process as defined by claim 1 further comprising the step of increasing the activity of said reactivated catalyst recovered from said combustion zone by treating said recovered catalyst with an ammonium ion-containing solution.

16. A process as defined by claim 15 wherein said ammonium ion-containing solution is an aqueous ammonia solution containing a dissolved ammonium salt.

17. A process as defined by claim 16 wherein said dissolved ammonium salt is ammonium carbonate, ammonium bicarbonate, or ammonium nitrate.

18. A process as defined by claim 1 wherein said porous, inorganic refractory oxide comprises alumina.

19. A process as defined by claim 1 wherein said reactivated catalyst has an activity temperature for hydrocracking less than about 40° F. above the activity temperature of said fresh catalyst.

20. A process as defined by claim 1 wherein said reactivated catalyst has an activity temperature for hydrocracking less than about 36° F. above the activity temperature of said fresh catalyst.

21. A process for reactivating a deactivated hydrocracking catalyst produced by subjecting a fresh hydrocracking catalyst to hydrocracking conditions in the presence of a hydrocarbon feedstock, wherein said deactivated catalyst comprises (1) a crystalline dealuminated Y zeolite having an overall silica-to-alumina mole ratio above about 6.0, said zeolite having been ion-exchanged with rare earth-containing cations and Group VIII noble metal-containing cations, (2) a porous, inorganic refractory oxide and (3) carbonaceous deposits, which process comprises:
   (a) contacting said deactivated catalyst with a flowing gas containing between about 20 and about 25 volume percent molecular oxygen in a combustion zone at a temperature between about 1025° F. and 1175° F. for a time sufficient to remove at least a portion of said carbonaceous deposits via combustion and thereby produce a regenerated catalyst;
   (b) contacting said regenerated catalyst with an aqueous ammonia solution containing a dissolved ammonium salt while correlating the contacting time with the temperature and reagent strength so as to effect a substantial improvement in activity of said catalyst, thereby producing a rejuvenated catalyst;

(c) separating said rejuvenated catalyst from said aqueous ammonia solution; and (d) drying and calcining said separated catalyst to produce a reactivated catalyst having an activity temperature for hydrocracking less than about 5° F. above the activity temperature of said fresh catalyst.

22. A process as defined by claim 21 wherein said Group VIII noble metal-containing cations comprise platinum or palladium.

23. A process as defined by claim 21 wherein said inorganic refractory oxide is alumina and said Group VIII noble metal-containing cations comprise palladium.

24. A process as defined by claim 23 wherein said deactivated catalyst is contacted in said combustion zone with flowing air at a temperature between about 1050° F. and 1150° F.

25. A process as defined by claim 24 wherein said crystalline dealuminated Y zeolite is LZ-210 zeolite.

26. A process as defined by claim 25 wherein said ammonium salt is ammonium bicarbonate.

27. A process as defined by claim 21 wherein said Group VIII noble metal-containing cations comprise palladium.

28. A process as defined by claim 21 wherein said porous, inorganic refractory oxide comprises alumina.

29. A process as defined by claim 21 wherein said flowing gas comprises air.

30. A process as defined by claim 21 wherein said deactivated catalyst is contacted with said flowing gas at a temperature between about 1050° F. and about 1150° F.

31. A process as defined by claim 21 wherein said deactivated catalyst is contacted with said flowing gas at a temperature between about 1075° F. and about 1125° F.

32. A process as defined by claim 21 wherein said deactivated catalyst is contacted with said flowing gas for a period of time between about 2.0 and about 6.0.

33. A process as defined by claim 21 wherein said reactivated catalyst has an activity greater than the activity of said fresh catalyst.

34. A process for reactivating a deactivated hydrocracking catalyst produced by subjecting a fresh catalyst to hydrocracking conditions in the presence of a hydrocarbon feedstock, wherein said deactivated catalyst comprises (1) a crystalline, dealuminated Y zeolite having an overall silica-to-alumina mole ratio above about 6.0, said zeolite having been ion-exchanged with rare earth-containing cations and Group VIII noble metal-containing cations, (2) an inorganic refractory oxide and (3) carbonaceous deposits, which process comprises:

(a) contacting said deactivated catalyst with a gas consisting essentially of air in a combustion zone at a temperature between about 1025° F. and 1175° F. for a time sufficient to remove at least a portion of said carbonaceous deposits by combustion; and (b) recovering a reactivated catalyst from said combustion zone, said reactivated catalyst having an activity temperature for hydrocracking less than about 48° F. above the activity temperature of said fresh catalyst.

35. A process as defined by claim 34 wherein said Group VIII noble metal-containing cations comprise platinum or palladium.

36. A process as defined by claim 35 wherein said inorganic refractory oxide comprises alumina.

37. A process as defined by claim 34 wherein said deactivated catalyst is contacted with said flowing gas at a temperature between about 1050° F. and about 1150° F.

38. A process as defined by claim 34 wherein said deactivated catalyst is contacted with said flowing gas at a temperature between about 1075° F. and about 1125° F.

39. A process as defined by claim 34 further comprising the step of increasing the activity of said reactivated catalyst recovered from said combustion zone by treating said recovered catalyst to disperse said noble metal-containing cations.

40. A process as defined by claim 34 further comprising the step of increasing the activity of said reactivated catalyst recovered from said combustion zone by treating said recovered catalyst with an ammonium ion-containing solution.

41. A process as defined by claim 40 wherein said ammonium ion-containing solution is an aqueous ammonia solution containing a dissolved ammonium salt.

42. A process as defined by claim 41 wherein said treated recovered catalyst has an activity temperature for hydrocracking less than about 5° F. above the activity temperature of said fresh catalyst.

43. A process as defined by claim 41 wherein said treated, recovered catalyst has an activity greater than the activity of said fresh catalyst.

* * * * *

UNITED STATES PATENT AND TRADEMARK OFFICE
CERTIFICATE OF CORRECTION

PATENT NO. : 5,206,194

DATED : April 27, 1993

INVENTOR(S) : Danford E. Clark

It is certified that error appears in the above-identified patent and that said Letters Patent is hereby corrected as shown below:

On title page; item [54], after "GROUP VIII" and before "Metal" insert -- NOBLE --.

On title page, item [56], column 2, line 7, insert

--OTHER PUBLICATIONS

P. Gallezot, "Catalytic Activity of Very Small Particles of Platinum Supported in Y-Type Zeolites," Catalysis by Zeolites, Elsevier Scientific Publishing Company, 1980, pp. 227-234.--

Column 17, line 57, after "20° F." insert -- [+22-(+2)] --

Signed and Sealed this

Third Day of May, 1994

Attest:

BRUCE LEHMAN

Attesting Officer

Commissioner of Patents and Trademarks